United States Patent
Tsai et al.

(10) Patent No.: US 11,258,897 B2
(45) Date of Patent: Feb. 22, 2022

(54) COMMUNICATION DEVICE CONTROLLING METHOD

(71) Applicant: MEDIATEK INC., Hsin-Chu (TW)

(72) Inventors: Chih-Yuan Tsai, Hsin-Chu (TW); Wang-Hsin Kuo, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/661,990

(22) Filed: Oct. 23, 2019

(65) Prior Publication Data

US 2020/0137226 A1    Apr. 30, 2020

Related U.S. Application Data

(60) Provisional application No. 62/750,280, filed on Oct. 25, 2018.

(51) Int. Cl.
| | |
|---|---|
| *H04M 3/42* | (2006.01) |
| *H04W 76/18* | (2018.01) |
| *H04W 76/27* | (2018.01) |
| *H04W 76/30* | (2018.01) |
| *H04M 7/00* | (2006.01) |
| *H04W 8/18* | (2009.01) |

(52) U.S. Cl.
CPC ....... *H04M 3/42051* (2013.01); *H04M 7/006* (2013.01); *H04W 8/18* (2013.01); *H04W 76/18* (2018.02); *H04W 76/27* (2018.02); *H04W 76/30* (2018.02)

(58) Field of Classification Search
CPC ........... H04M 17/103; H04M 3/42051; H04M 7/006; H04M 3/4288; H04M 2207/18; H04M 7/0024; H04W 88/06; H04W 76/18; H04W 76/30; H04W 76/27; H04W 8/18
See application file for complete search history.

(56) References Cited

U.S. PATENT DOCUMENTS

| | | | |
|---|---|---|---|
| 2013/0150014 A1* | 6/2013 | Gong .................... | H04W 68/12 455/418 |
| 2013/0150036 A1* | 6/2013 | Pattaswamy .......... | H04W 8/183 455/435.1 |
| 2014/0220981 A1 | 8/2014 | Jheng | |
| 2016/0095157 A1 | 3/2016 | Wenzel | |
| 2016/0142998 A1* | 5/2016 | Tsai ..................... | H04B 1/3816 455/458 |
| 2017/0134994 A1 | 5/2017 | Chinthalapudi | |
| 2018/0167853 A1* | 6/2018 | Wang .................... | H04M 3/387 |

FOREIGN PATENT DOCUMENTS

TW              201633816 A        9/2016

\* cited by examiner

*Primary Examiner* — Quoc Thai N Vu
(74) *Attorney, Agent, or Firm* — Winston Hsu

(57) ABSTRACT

A communication device controlling method, for controlling a communication device including a first subscriber identification and a second subscriber identification when a process of a data call established with the first subscriber identification is in a suspension, comprising: (a) receiving, by a processor of the communication device, a request to establish a mobile terminated (MT) call with the second subscriber identification; and (b) resuming, by the processor, the process of the data call from the suspension before an instruction of accepting or rejecting the request is received if the MT call is packet-switch based.

13 Claims, 7 Drawing Sheets

COMMUNICATION DEVICE CONTROLLING METHOD

CROSS REFERENCE TO RELATED APPLICATIONS

This application claims the benefit of U.S. Provisional Application No. 62/750,280, filed on Oct. 25, 2018, the contents of which are incorporated herein by reference.

BACKGROUND

For a conventional communication device, if a request of establishing a MT (Mobile Terminated) call is coming, the ongoing data call must be suspended until the user picks up or rejects the MT call. However, if the user thinks the data call is more important than the MT call, such design may cause bad user experience. Such issue is more serious when the data call is used to receive important real time information.

SUMMARY

One objective of the present invention is to provide a communication device controlling method which can make a user feel a data call keeps going when a MT call is coming.

One embodiment of the present invention is to provide a communication device controlling method, for controlling a communication device including a first subscriber identification and a second subscriber identification when a process of a data call established with the first subscriber identification is in a suspension, comprising: (a) receiving, by a processor of the communication device, a request to establish a mobile terminated (MT) call with the second subscriber identification; and (b) resuming, by the processor, the process of the data call from the suspension before an instruction of accepting or rejecting the request is received if the MT call is packet-switch based.

Another embodiment of the present invention is to provide a communication device controlling method, for controlling a communication device with a first subscriber identification and a second subscriber identification when a process of a data call established with the first subscriber identification is in a suspension, comprising: (a) receiving, by a processor of the communication device, a request to establish a mobile terminated (MT) call with the second subscriber identification; and (b) rejecting, by the processor, to establish the MT call with the second subscriber identification; and (c) resuming, by the processor, the process of the data call from the suspension. Such embodiment can be used for a packet-switch based call or a circuit-switch based call.

In view of above-mentioned embodiments, since the data call can be suspended in a very short time, thus the communication device controlling method provided by the present invention can make a user feel the data call can keep going when a MT call is coming, thus can provide better user experience to the user.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The components in the embodiments can be implemented by hardware (e.g. circuit or device) or firmware (e.g. a processor installed with at least one program). Additionally, the terms "first", "second" . . . and the like in following embodiments are only for defining different components, devices, or parameters, but do not mean the sequence thereof.

Figure 1:
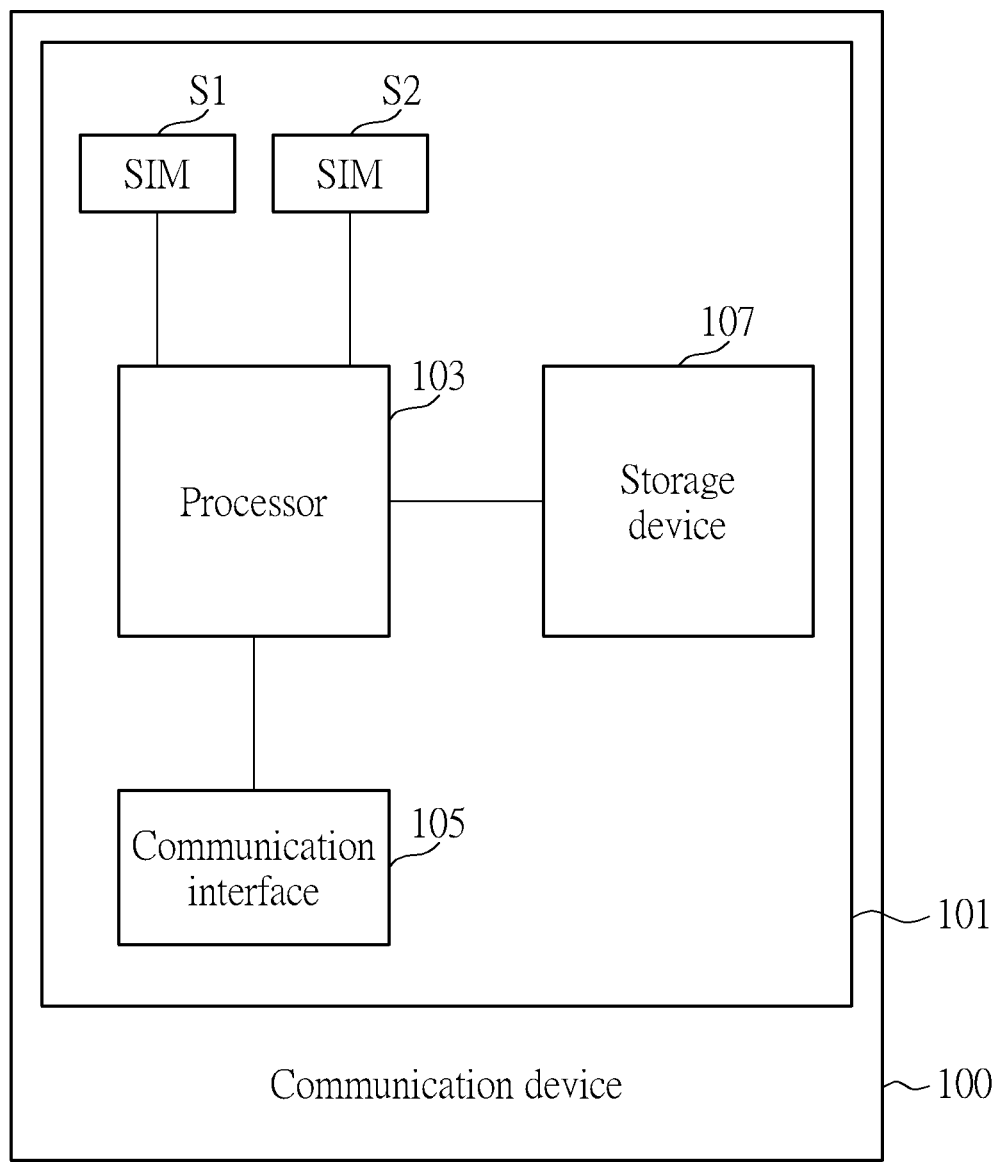
FIG. 1 is a block diagram illustrating a communication device according to one embodiment of the present invention.

FIG. 1 is a block diagram illustrating a communication device according to one embodiment of the present invention. As illustrated in FIG. 1, the communication device 100 comprises a screen 101, a processor 103, a communication interface 105, and a storage device 107. The processor 103 can read at least one program stored in the storage device 107 to control the communication interface 105 to receive or transmit data, or to control the screen 103 to display required images or information. The communication device 100 further comprises two SIMs (Subscriber Identity Module) S1, S2. The communication device 100 can have first subscriber identification and second subscriber identification via the SIMs S1 and S2. However, the communication device 100 can have the first subscriber identification and the second subscriber identification via other circuits or devices. The storage device 107 can be any kind of storage devices, such as a memory or a hard disk drive. The storage device 107 can be provided in the communication device 100 or be a cloud drive. Also, the communication interface 105 can follow various communication standards, such as Wifi, HiperLAN, 4G LTE, 4G WiMAX or 5G NR. However, the communication interface 105 is not limited to follow these communication standards.

Figure 2:
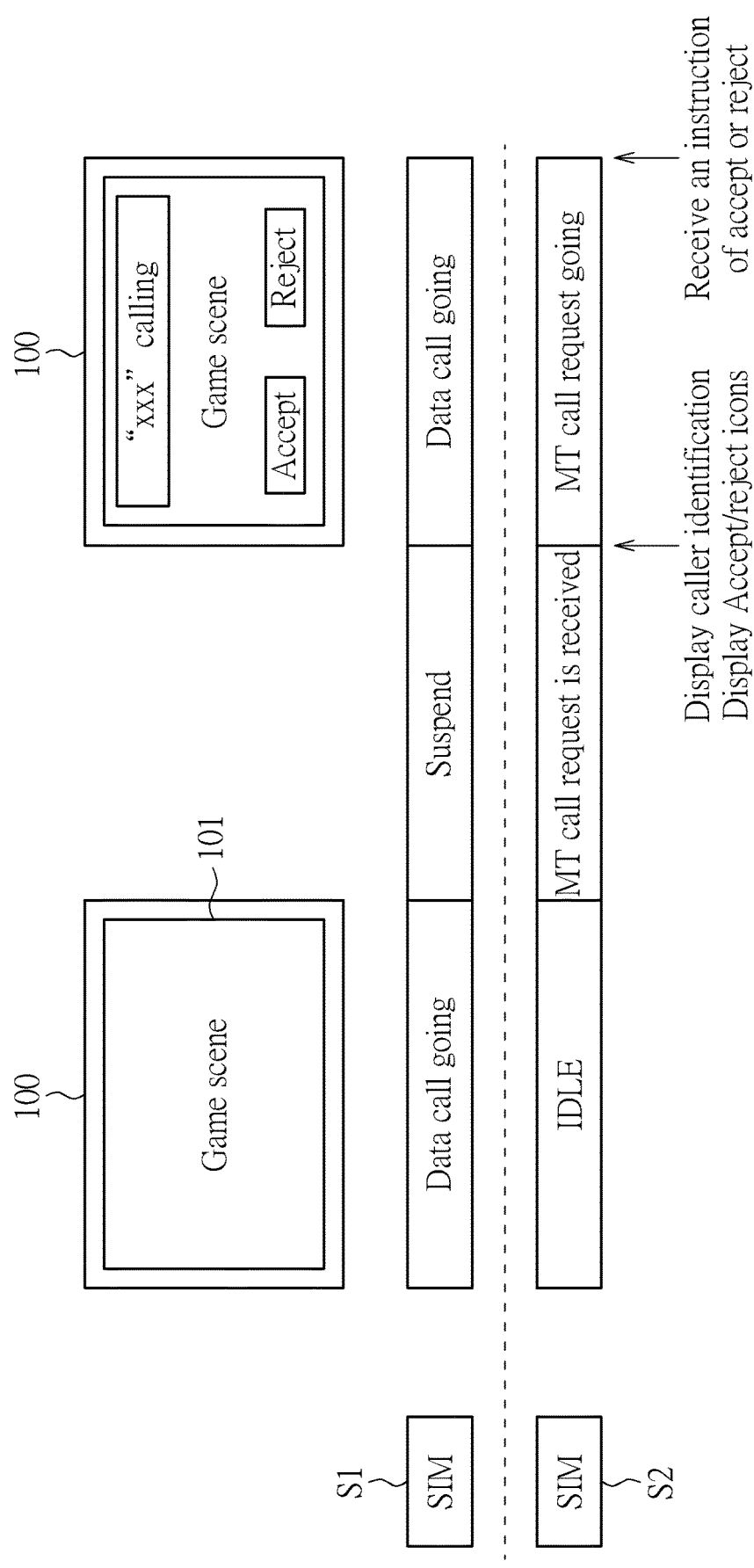
FIG. 2 is a schematic diagram illustrating a communication device controlling method according to one embodiment of the present invention.

In following embodiments, communication device controlling methods provided by the present invention is performed by but not limited to the above-mentioned communication device 100. FIG. 2 is a schematic diagram illustrating a communication device controlling method according to one embodiment of the present invention. As shown in FIG. 2, a data call is established with the first subscriber identification (i.e. using the SIM S1). The data call can be established for a game or any other real-time application (e.g. a video calling application), but not limited. In following embodiments, the data call is established for a game thus the screen 101 displays a game scene while the data call going.

In the embodiment of FIG. 2, the processor 103 of the communication device 100 receives a request of establishing a MT call with the second subscriber identification (i.e. using the SIM S2) while the data call is going on the communication device 100. In following descriptions, for the convenience of explaining, the request of establishing a MT call may be named as "the request of the MT call", "MT call request" or "the request". In such case, the data call is suspended and a caller identification of the MT call, e.g. a phone number of the caller, can be acquired. In one embodiment, the caller identification is included in the request of establishing the MT call. The screen 101 may display the caller identification such that the user can know which phone number is calling, such as the information "xxx is calling" in FIG. 2. The caller identification can be matched to an address book stored in the storage device 107 thus the screen 101 can display the caller name corresponding to the call identification. Besides, the caller identification or the caller name can be shown in other types of message rather than information displayed on the screen 101. For example, the caller identification or the caller name can be broadcasted via a voice message.

Also, the user of the communication device 100 can accept or reject the request of establishing the MT call. If the user accepts the request of establishing the MT call, which also means the processor 103 receives the instruction of accepting the request of establishing the MT call, the processor 103 establishes the MT call with the second subscriber identification and suspends the process of the data call. On the contrary, if the user rejects the request of establishing the MT call, which also means the processor 103 receives the instruction of rejecting the request of establishing the MT call, the processor 103 rejects the request of establishing the MT call with the second subscriber identification. In one embodiment, the screen 101 displays icons of "accept" and "reject" such that the user can accept or reject the request of establishing the MT call by touching the icons. However, the user can accept or reject the request of establishing the MT call via other mechanisms. For example, the user can accept or reject the request of establishing the MT call via voice commands or via triggering at least one hardware button of the communication device 100. Additionally, in one embodiment, the processor 103 rejects the request of establishing the MT call and/or keeps the process of the data call if both the instruction of accepting the request and the instruction of rejecting the request are not received for a period of time, which means the user does not accept or reject the request of establishing the MT call for a period of time.

Further, in the embodiment of FIG. 2, the processor 103 resumes the process of the data call from the suspension before receives an instruction of accepting or rejecting the request of establishing the MT call. In other words, the processor 103 resumes the process of the data call before the user accept or rejects the request of establishing the MT call. By this way, the data call can be suspended for a very short time and then be resumed before the user accept or rejects the request of establishing the MT call. Accordingly, the user may feel the game is never being interrupted and smoothly goes even a MT call is attempting to connect with the user.

In the embodiment of FIG. 2, a Radio Resource Control (RRC) connection of the MT call is released such that the data call can be resumed. The releasing of the RRC connection can be performed at various timings. For example, the releasing of the RRC connection can be performed when or after the request of establishing the MT call is received, when or after the caller identification is acquired, or after the ring tone signal is sent to the caller.

The MT call in the embodiment of FIG. 2 can be packet-switch based. For example, the MT call can be a VoLTE call or a VoNR call. However, the MT call is not limited to these examples. The MT call can be any kind of call of which the request can be maintained even if the RRC connection is released.

Figure 3:
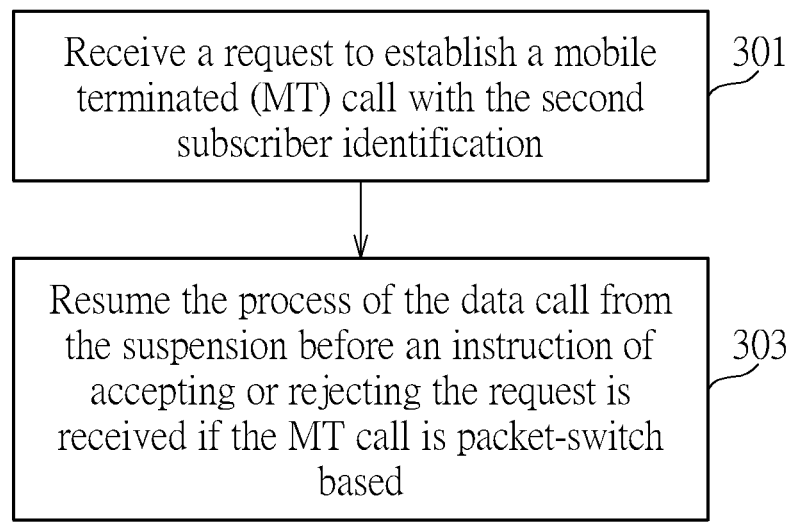
FIG. 3 is a flow chart illustrating a communication device controlling method corresponding to the embodiment illustrated in FIG. 2.

FIG. 3 is a flow chart illustrating a communication device controlling method corresponding to the embodiment illustrated in FIG. 2. The flow chart in FIG. 3 is for controlling a communication device including a first subscriber identification and a second subscriber identification (e.g. the communication device 100 in FIG. 1) when a process of a data call established with the first subscriber identification is in a suspension. The flow chart in FIG. 3 comprises the steps of:

Step 301

Receive, by a processor 103 of the communication device 100, a request to establish a mobile terminated (MT) call with the second subscriber identification.

Step 303

Resume, by the processor 103, the process of the data call from the suspension before an instruction of accepting or rejecting the request is received if the MT call is packet-switch based.

The flow chart illustrated in FIG. 3 can be applied to a MT call of which the request can be maintained when the RRC connection is released, such as a packet-switch based call. Other details steps have been explained in the embodiment of FIG. 2, thus are omitted here for brevity.

Figure 4:
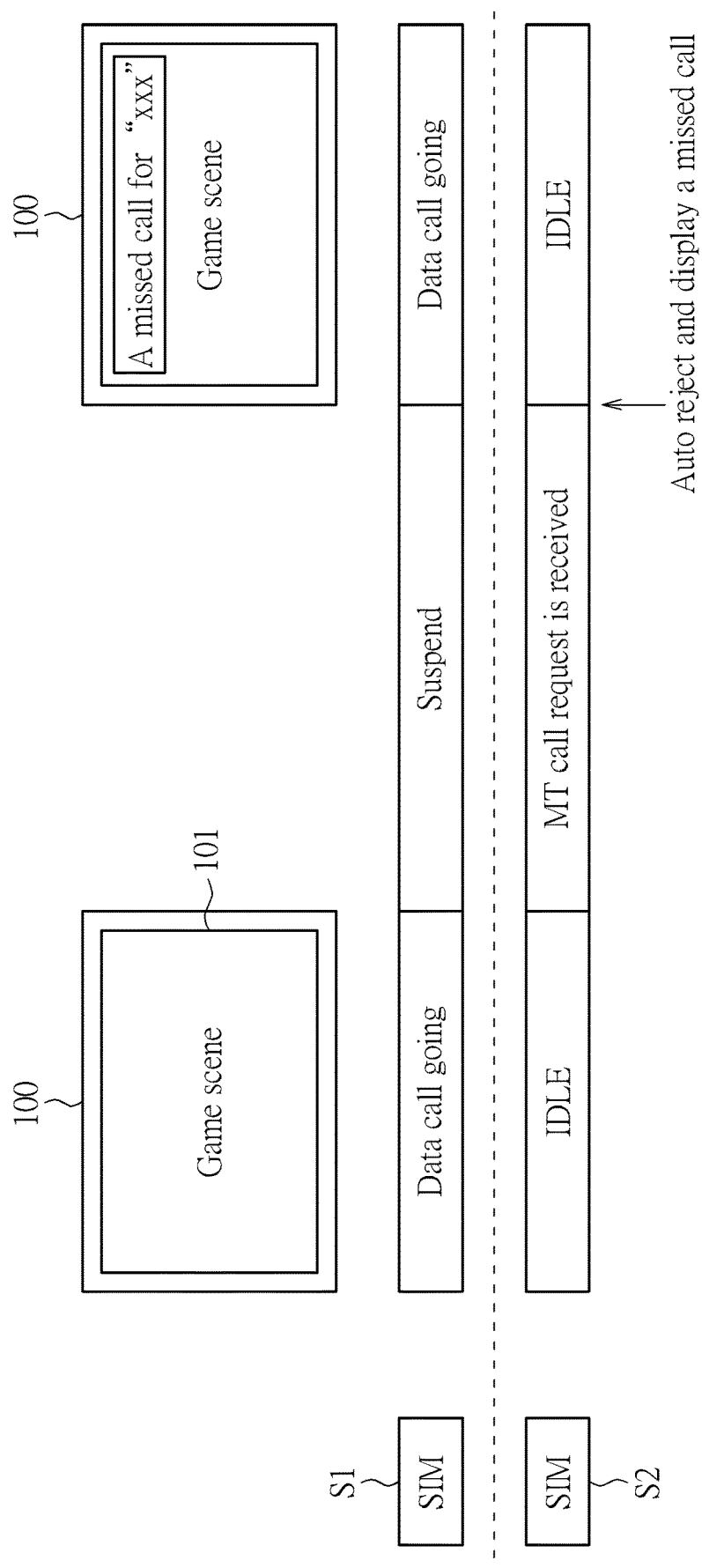
FIG. 4 is a schematic diagram illustrating another communication device controlling method according to one embodiment of the present invention.

FIG. 4 is a schematic diagram illustrating another communication device controlling method according to one embodiment of the present invention. In the embodiment of FIG. 4, the processor 103 of the communication device 100 receives a request of establishing a MT call with the second subscriber identification (i.e. using the SIM S2) while the data call is going on the communication device 100. In such case, the data call is suspended and a caller identification of the MT call can be acquired. In one embodiment, the caller identification is included in the request of establishing the MT call.

The embodiment of FIG. 4 may be applied to a system in which a request of MT call cannot be maintained when the RRC connection is released, such as a circuit-switch based communication system. Therefore, the processor 103 automatically rejects the request of establishing the MT call, such that the RRC connection can be released, and then resumes the data call. In one embodiment, the processor 103 rejects the request of establishing the MT call after acquires the caller identification, and the screen 103 displays the missed call, such as the information "a missed call for xxx" in FIG. 4. Please note, the MT call can be any kind of call of which the request cannot be maintained when the RRC connection is released, rather than circuit-switch based call. Moreover, the embodiment in FIG. 4 may also be applied to a system in which a request of MT call can be maintained when the RRC connection is released, such as VoLTE, VoNR or any packet-switch based communication system.

Figure 5:
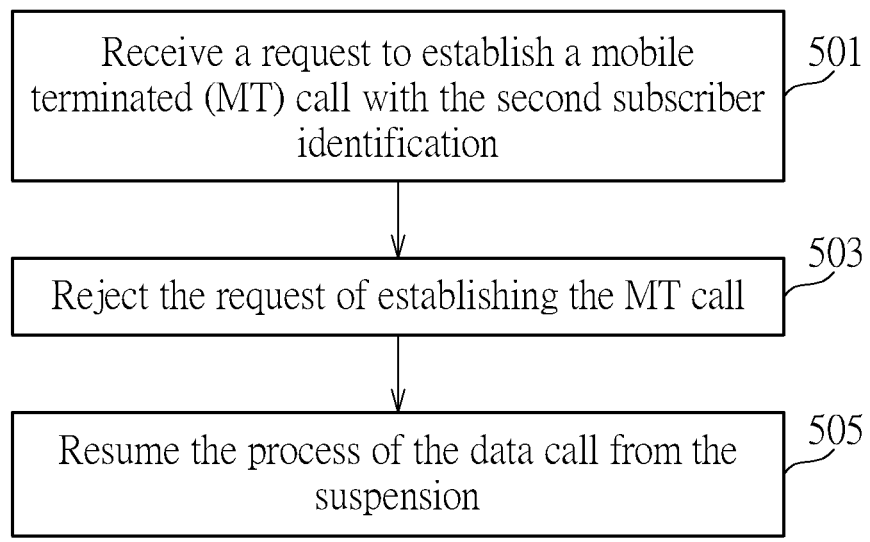
FIG. 5 is a flow chart illustrating a communication device controlling method corresponding to the embodiment illustrated in FIG. 4.

FIG. 5 is a flow chart illustrating a communication device controlling method corresponding to the embodiment illustrated in FIG. 4. The flow chart in FIG. 5 is for controlling a communication device including a first subscriber identification and a second subscriber identification (e.g. the communication device 100 in FIG. 1) when a process of a data call established with the first subscriber identification is in a suspension. The flowchart in FIG. 5 comprises the steps of:

Step 501

Receive, by a processor 103 of the communication device 100, a request to establish a mobile terminated (MT) call with the second subscriber identification.

Step 503

Reject, by the processor 103, to establish the MT call with the second subscriber identification Step 505

Resume, by the processor 103, the process of the data call from the suspension.

The flow chart illustrated in FIG. 5 can be applied to a MT call of which the request cannot be maintained when the RRC connection is released, such as a circuit-switch based call. Moreover, the flow chart in FIG. 5 can be applied to a MT call of which the request can be maintained when the RRC connection is released, such as a packet-switch based call. Other detail steps have been explained in the embodiment of FIG. 4, thus are omitted here for brevity.

Figure 6:
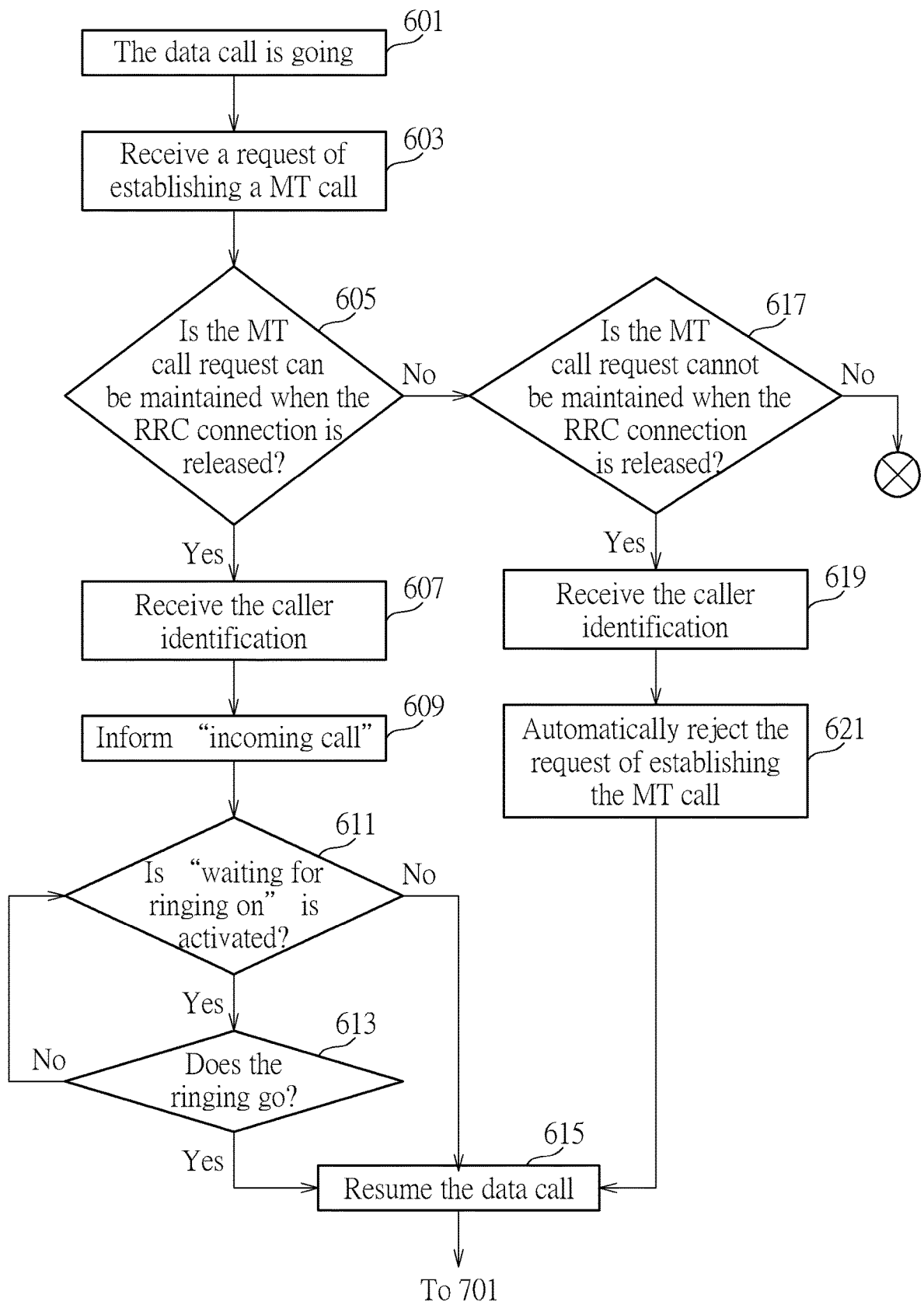
FIG. 6 and FIG. 7 are flow charts illustrating communication device controlling methods according to other embodiments of the present invention.

The embodiments in FIG. 2 and FIG. 4 can be independently applied to the communication device 100. However, the embodiments in FIG. 2 and FIG. 4 can be combined as well. FIG. 6 is a flowchart illustrating a communication device controlling method according to another embodiment of the present invention, which comprises following steps:

Step 601

The data call with a first subscriber identification is going. The data call can be established for a game or any other real time application.

Step 603

Receive a request of establishing a MT call with a second subscriber identification, and suspend the data call.

Step 605

Determine if the MT call is a call of which the request can be maintained when the RRC connection is released, such as a packet-switch based call. If yes, go to step 607, if not, go to step 617.

Step 607

Receive the caller identification. In one embodiment, the caller identification is included in the request of establishing the MT call.

Step 609

Inform "incoming call". For example, displays the caller identification or the caller name on the screen 101 in FIG. 2.

Step 611

Check if "waiting for ringing on" is activated. If the "waiting for ringing on" is activated, the data call is resumed after the caller identified by the caller identification (i.e. the MO side) receives a ring tone signal, which means the caller can hear the ring tone. If the "waiting for ringing on" is not activated, the caller does not receive the ring tone signal and the data call is resumed. Accordingly, if the "waiting for ringing on" is activated, the flow goes to the step 613. Also, if the "waiting for ringing on" is not activated, the flow goes to the step 615. The time period that the caller can hear the ring tone can be set corresponding to different requirements.

Step 613

Determine whether the ringing goes or not? If yes, go to step 615, if not, go back to the step 611.

Step 615

Resume the data call.

Step 617

Determine whether the MT call is a call of which the request cannot be maintained when the RRC connection is released, such as a circuit-switch based call. If yes, go to step 619, if not, the flow ends or go to another flow for processing other kinds of calls. The steps 605 and 617 can be combined to a single step.

Step 619

Receive the caller identification. In one embodiment, the caller identification is included in the request of establishing the MT call.

Step 621

Automatically reject the request of establishing the MT call. After that, inform "missed call", for example, displays the information of "missed call" on the screen 101 in FIG. 2.

Figure 7:
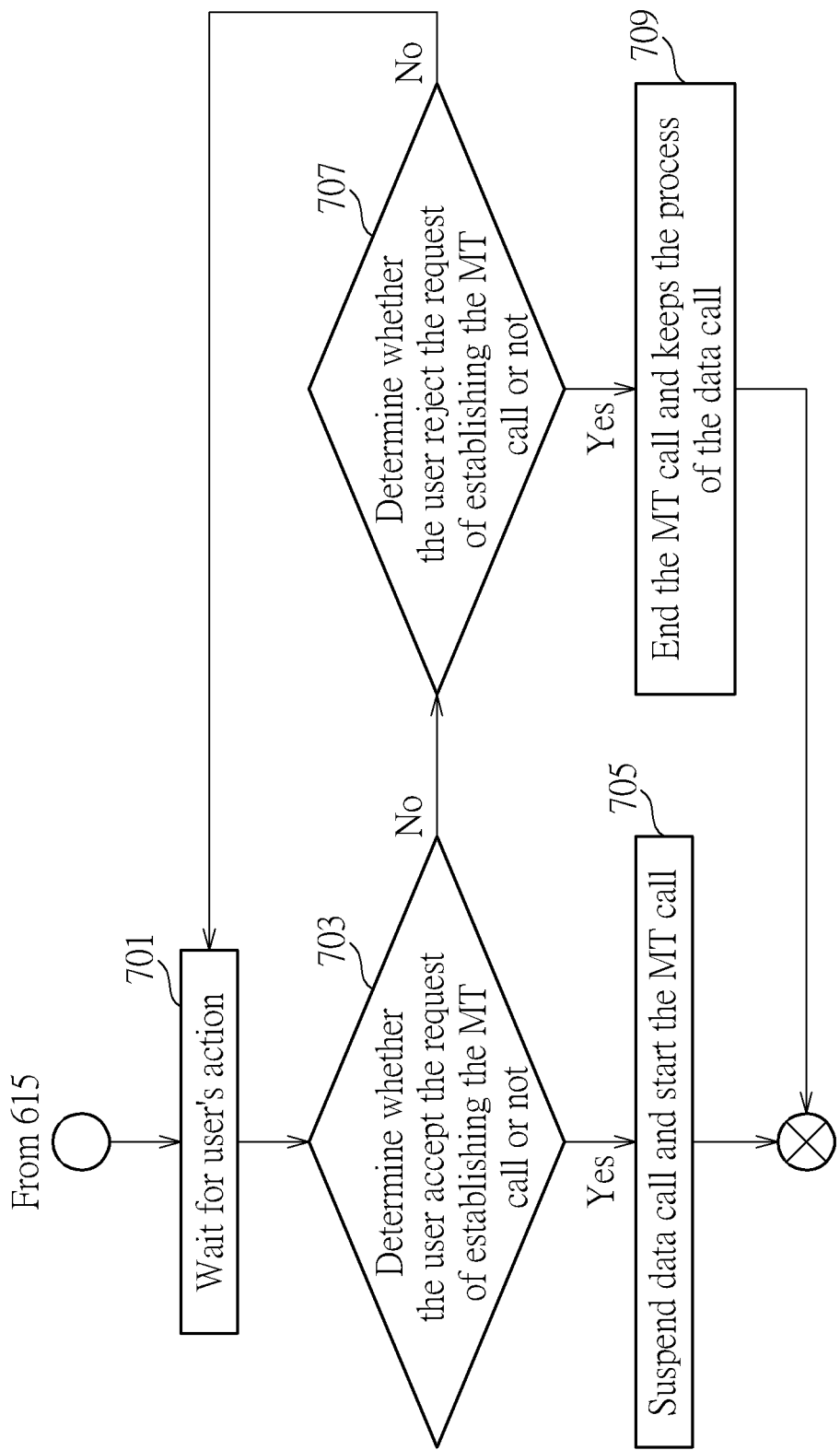

The flow chart illustrated in FIG. 7 follows the step 615 in FIG. 6, which comprises following steps:

Step 701

Wait for user's action.

Step 703

Determine whether the user accept the request of establishing the MT call or not. For example, the user triggers the icon "accept" on the screen 101 in FIG. 2. If yes, go to step 705, if not, go to step 709.

Step 705

Suspend data call and start the MT call.

Step 707

Determine whether the user rejects the request of establishing the MT call or not. For example, the user triggers the icon "reject" on the screen 101 in FIG. 2. If yes, go to step 709, if not, go to step 701.

Step 709

End the MT call and keeps the process of the data call.

In view of above-mentioned embodiments, since the data call can be suspended in a very short time, thus the communication device controlling method provided by the present invention can make a user feel the data call can keep going when a MT call is coming, thus can provide better user experience to the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device controlling method, for controlling a communication device including a first subscriber identification and a second subscriber identification when a process of a data call established with the first subscriber identification is in a suspension, comprising:
    (a) receiving, by a processor of the communication device, a request to establish a mobile terminated (MT) call with the second subscriber identification;
    (b) starting a timer;
    (c) determining if the MT call is packet-switch based or circuit-switch based;
    (d) when the MT call is packet-switch based, determining a caller identification or a caller name corresponding to the caller identification included in the request, then resuming, by the processor, the process of the data call from the suspension before an instruction of accepting or rejecting the request is received and before timeout is reached; and
    (e) rejecting, by the processor, to establish the MT call when both the instruction of accepting the request and the instruction of rejecting the request are not received when timeout is reached.

2. The communication device controlling method of claim 1, further comprising establishing, by the processor, the MT call with the second subscriber identification and suspending again, by the processor, the process of the data call when the instruction of accepting the request is received before timeout.

3. The communication device controlling method of claim 1, further comprising rejecting, by the processor, to establish the MT call with the second subscriber identification when the instruction of rejecting the request is received before timeout.

4. The communication device controlling method of claim 1, further comprising displaying, by a screen of the communication device, the caller identification or the caller name corresponding to the caller identification included in the request.

5. The communication device controlling method of claim 1, wherein the MT call is a VoLTE call or a VoNR call.

6. The communication device controlling method of claim 1, wherein the data call is resumed by releasing an RRC connection of the MT call after the request is received or a ring tone signal is sent to a caller identified by the caller identification.

7. The communication device controlling method of claim 1, wherein the data call is established for a game or a real-time application.

8. The communication device controlling method of claim 1, further comprising when the MT call is circuit-switch based, determining a caller identification, then rejecting, by the processor, to establish the MT call with the second subscriber identification before timeout is reached.

9. A communication device controlling method, for controlling a communication device with a first subscriber identification and a second subscriber identification when a process of a data call established with the first subscriber identification is in a suspension, comprising:
  (a) receiving, by a processor of the communication device, a request to establish a mobile terminated (MT) call with the second subscriber identification;
  (b) starting a timer;
  (c) determining if the MT call is packet-switch based or circuit-switch based;
  (d) when the MT call is circuit-switch based, determining a caller identification, then rejecting, by the processor, to establish the MT call with the second subscriber identification and resuming, by the processor, the process of the data call from the suspension before timeout is reached;
  (e) when the MT call is packet-switch based, determining a caller identification or a caller name corresponding to the caller identification included in the request, then resuming, by the processor, the process of the data call from the suspension before an instruction of accepting or rejecting the request is received before timeout is reached; and
  (f) rejecting, by the processor, to establish the MT call when both the instruction of accepting the request and the instruction of rejecting the request are not received when timeout is reached.

10. The communication device controlling method of claim 9, further comprising displaying, by a screen of the communication device, the caller identification.

11. The communication device controlling method of claim 9, wherein the data call is established for a game or a real-time application.

12. The communication device controlling method of claim 9, further comprising establishing, by the processor, the MT call with the second subscriber identification and suspending, by the processor, the process of the data call when the instruction of accepting the request is received.

13. The communication device controlling method of claim 9, further comprising rejecting, by the processor, to establish the MT call with the second subscriber identification when the instruction of rejecting the request is received.

* * * * *